(12) United States Patent
Wiseman et al.

(10) Patent No.: US 9,160,850 B2
(45) Date of Patent: Oct. 13, 2015

(54) METHOD AND SYSTEM FOR INFORMING CUSTOMER SERVICE AGENT OF DETAILS OF USER'S INTERACTION WITH VOICE-BASED KNOWLEDGE RETRIEVAL SYSTEM

(75) Inventors: Brady Wiseman, Bozeman, MT (US); Dana Allison, Lima, NY (US)

(73) Assignee: ORACLE OTC SUBSIDIARY LLC, Redwood Shores, CA (US)

( * ) Notice: Subject to any disclaimer, the term of this patent is extended or adjusted under 35 U.S.C. 154(b) by 2166 days.

(21) Appl. No.: 11/279,015

(22) Filed: Apr. 7, 2006

(65) Prior Publication Data

US 2007/0263838 A1   Nov. 15, 2007

(51) Int. Cl.
*H04M 3/51* (2006.01)

(52) U.S. Cl.
CPC ........ *H04M 3/5166* (2013.01); *H04M 2201/38* (2013.01); *H04M 2203/2011* (2013.01)

(58) Field of Classification Search
CPC .......... H04M 3/5322; H04M 2250/66; H04M 3/4931; H04M 7/0009; H04M 7/0024; H04M 7/0036; H04M 11/10; H04M 1/2535
USPC ........................................ 379/266.01, 265.08
See application file for complete search history.

(56) References Cited

U.S. PATENT DOCUMENTS

| | | | |
|---|---|---|---|
| 6,847,715 B1 * | 1/2005 | Swartz | 379/266.01 |
| 6,879,685 B1 * | 4/2005 | Peterson et al. | 379/265.11 |
| 2004/0008828 A1 * | 1/2004 | Coles et al. | 379/88.01 |
| 2004/0083213 A1 * | 4/2004 | Wu et al. | 707/4 |
| 2005/0071360 A1 * | 3/2005 | Crapp et al. | 707/102 |
| 2006/0262921 A1 * | 11/2006 | Eppel et al. | 379/265.02 |

* cited by examiner

*Primary Examiner* — Amal Zenati
(74) *Attorney, Agent, or Firm* — Kilpatrick Townsend & Stockton LL

(57) ABSTRACT

The present invention describes a method and system for informing a customer service agent of the details of a service user's interaction with a voice-based knowledge retrieval system. More particularly the invention is directed to a method of informing a customer service agent of details of a user's interaction with a voice retrieval system including the steps of providing a user of a voice retrieval system with a list of one or more information items, playing the one or more information items to the user in response to one or more user inputs, storing a transcript of the user's interaction with the one or more information items, transferring the user from the voice retrieval system to a customer service agent in response to the one or more user inputs; and providing the customer service agent with the transcript of the user's interaction with the one or more information items.

34 Claims, 5 Drawing Sheets

Fig. 2
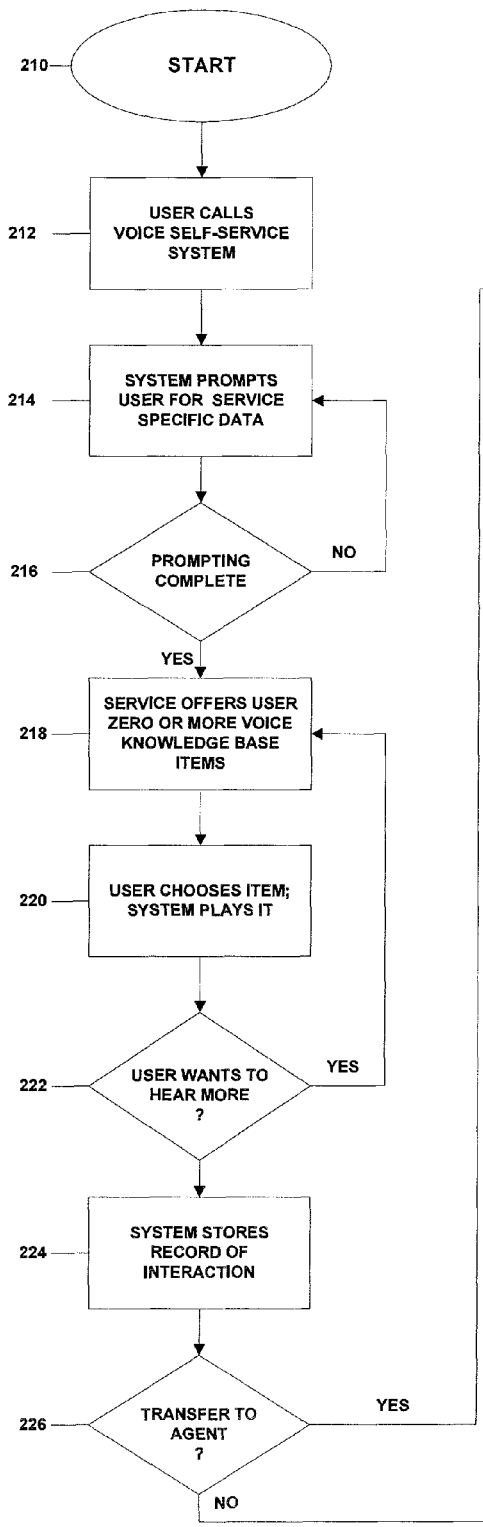
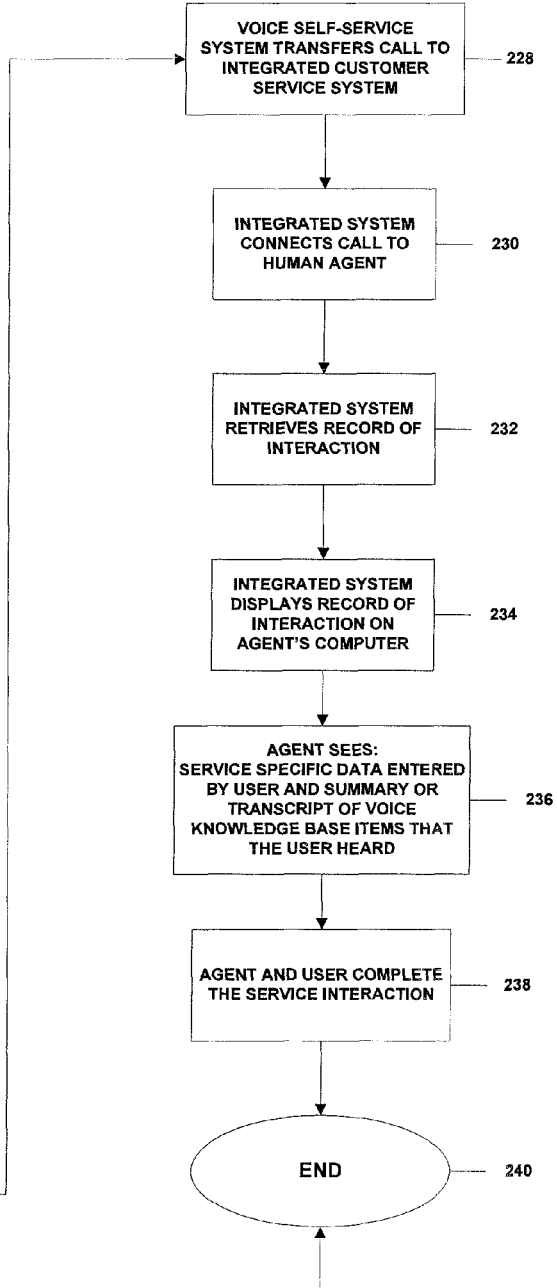

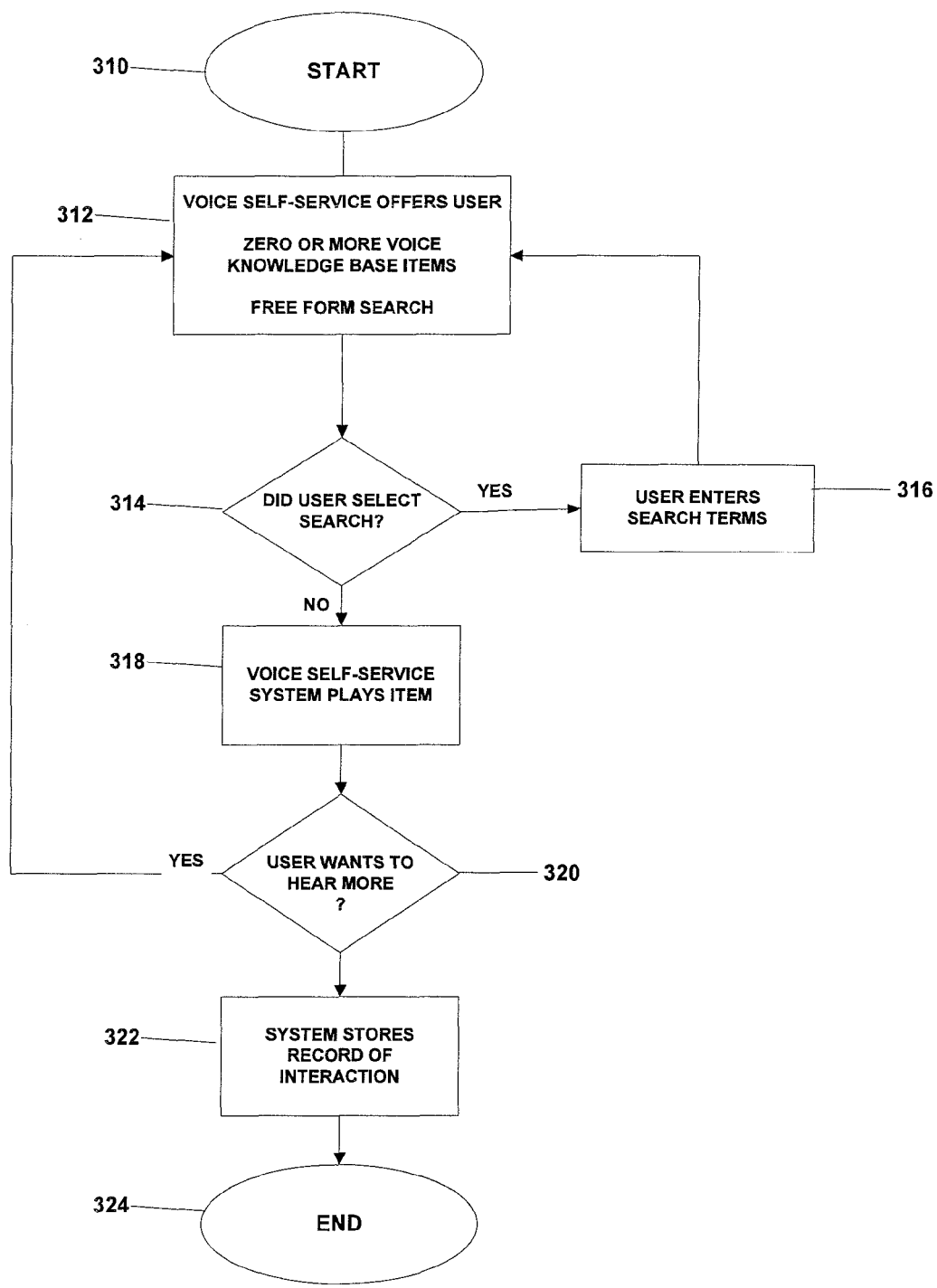

| | 402 | 404 | 406 | |
|---|---|---|---|---|
| | FIELD | TYPE | NULL | |
| | sessionid | varchar(11) | | 408 |
| | interface_id | smallint(6) | | 410 |
| | timestamp | timestamp | YES | 412 |
| | parm | varchar(32) | YES | 414 |
| | val | varchar(255) | YES | 416 |
| | c_id | int(11) | YES | 418 |

Fig. 4

1. Phone call from 406-555-1212
a. System query identifies that phone number maps to "Joe Customer"
2. Selected product = "Widget"
3. Listened to item: id=7, "How to configure your Widget"
4. Listened to item: id = 23, "Features of the Widget"
5. Interrupted item 23 after 15 seconds (total content = 47 seconds)
6. Searched using terms: "power supply"
7. Listened to item: id = 50, "Battery options for Widgets"

Fig. 5

| Session_id | interface_id | timestamp | parm | val | c_id |
|---|---|---|---|---|---|
| 4065551212AA | 1 | 032706-12:55:55 | phone | 4065551212 | 55 |
| 4065551212AA | 1 | 032706-12:56:03 | prod | Widget | 55 |
| 4065551212AA | 1 | 032706-12:56:10 | item | 7 | 55 |
| 4065551212AA | 1 | 032706-12:56:10 | len | 50 | 55 |
| 4065551212AA | 1 | 032706-12:57:00 | item | 23 | 55 |
| 4065551212AA | 1 | 032706-12:57:00 | len | 47 | 55 |
| 4065551212AA | 1 | 032706-12:57:15 | inter | 15 | 55 |
| 4065551212AA | 1 | 032706-12:57:23 | srch | power supply | 55 |
| 4065551212AA | 1 | 032706-12:57:28 | item | 50 | 55 |
| 4065551212AA | 1 | 032706-12:57:28 | len | 39 | 55 |
| 4065551212AA | 1 | 032706-12:58:07 | opt | escallate | 55 |

Fig. 6

METHOD AND SYSTEM FOR INFORMING CUSTOMER SERVICE AGENT OF DETAILS OF USER'S INTERACTION WITH VOICE-BASED KNOWLEDGE RETRIEVAL SYSTEM

CROSS-REFERENCE TO RELATED APPLICATIONS

None

BACKGROUND OF THE INVENTION

Traditional approaches to providing call center services have generally employed a combination of automated interactive voice response (IVR) systems and human call service agents. In operation, an incoming call will be interfaced with an automated IVR system as a first point of contact with a service user caller. If the user's issue is resolved by the information offered in the IVR system then there is no need to transfer the service user's call to a human Customer Service Agent (CSA). On the other hand, if the service user's issue cannot be resolved using the IVR system, as is more often the case as products and services have become more complex, the user's call may be escalated and eventually transferred to a human call service agent (CSA).

Current approaches for transferring a user's call from an IVR system to a CSA have several drawbacks. One drawback has to do with retention of information that a service user has entered in response to prompts from the IVR portion of the system. Current approaches offer little consistency as to what user-supplied information (if any) makes it from the IVR to a CSA when a service user's call is transferred.

Some progress has been made in transferring a limited amount of user-supplied information to an upstream CSA when a service user is transferred from an automated IVR system. For example, some approaches have featured the routing of limited information using the ANI (automatic number identification) field which is transferred between various systems in a call center. Other approaches have modified the ANI to potentially pass more information (such as U.S. Pat. No. 6,661,882, entitled System And Method for Automated Telephone Message Routing Using an Altered ANI). Still other call center approaches systems involve customer entered information (phone number, account id) or potentially identifying a particular skill level of the agent (such as U.S. Pat. No. 5,206,903, entitled Automatic Call Distribution Based On Matching Required Skills With Agents Skills) from the IVR to a CSA. While the above mentioned approaches are able to pass along a limited amount of information between various components of a call center, these approaches are limited to passing along a portion of extrinsic information, which may be of only marginal value for speedy and satisfactory completion of a service call.

One shortcoming that has not been satisfactorily addressed by current approaches is another problem that is likely to occur when a service user is transferred from an IVR to a CSA. The CSA might have the benefit of knowing the name and account number of the service user, however, the CSA does not know much else. Because of this, the CSA is likely to repeat the same information that the service user has already listened to using the IVR system. This is not especially desirable since the service user did not find the information that is now being repeated to him all that helpful the first time around, and is likely the reason that the service user has requested to speak to a human CSA.

Under current approaches, the CSA does not know what information the service user has previously heard or has been offered the option of listening to unless the CSA verbally questions the service user. Even under ideal circumstances, such as might be the case where a CSA possesses exceptional communication skills, relying on the service user for a summary of what information and options had already been provided to the user is not ideal for reasons including that the service user may have exhausted his/her patience during the IVR portion of the call or that the user may not be a good communicator particularly if the user has to contact the call center for help using a complex product or service that the service user really does not understand in the first place.

In sum, the aforementioned shortcomings of lost information and repeated information may result in low customer satisfaction and less than optimal efficiency in the time that is required to complete a service call.

Accordingly, it is desirable to provide a method and system which reduces the likelihood that a CSA will unknowingly repeat information that a service user has already heard. Also, it is desirable to provide a method and system which minimizes requests for the service user to report previously heard or offered information to the CSA. Additionally, it would be desirable to provide a system and method which may reduce the amount of time required to provide service to a user and improve call center efficiency by informing a CSA of the history and details of the service user's interaction with an IVR system.

SUMMARY OF THE INVENTION

The foregoing needs are met, to a great extent, by the present invention, wherein in one aspect a system/method is provided that in some embodiments will reduce the likelihood that a CSA will unknowingly repeat information that a service user has already heard by recording a transcript which provides implicit details of a user's interaction with knowledgebase and information items. There is also provided in the practice of the invention, a method and system which minimizes requests for the service user to report the information that has previously been heard or offered to the CSA. Additionally, provided in the practice of the invention is a method and system which can reduce the amount of time required to provide service to a user and improve call center efficiency by informing a CSA of the history and details of the service user's interaction with an IVR system.

A further advantage provided by embodiments of the inventive method and system is that by recording and storing a transcript of a service user's interaction with information items including knowledgebase items and search results, implicit details of a user's search and information path may be transferred between an IVR system and a CSA. Some embodiments of the inventive method and system for recording and storing implicit user interaction information allow this information to be transferred between any arbitrary a pair of devices or service interfaces. For example, in addition to the above described IVR and CSA desktop, a user's interaction transcript could be transferred from an internet chat system to a voice communication system (such as a phone or VOIP (Voice over Internet Protocol) system), an internet chat system and an agent desktop, an IVR and an internet chat system, or any other sequence of information technology pieces.

In accordance with one aspect of the present invention, at the time that a service user's call is transferred from an IVR system to a CSA, the CSA is informed of implicit details of a service user's interaction with a voice-based service system.

Examples of implicit details include identification data that the user provided to the automated system, and a summary or full transcript of all knowledgebase information that the system provided to the user via the voice or keypad interface. A benefit of this aspect of the present inventive method and system is that providing implicit call transcript information to an upstream CSA gives the CSA a much broader base of information to provide the assistance to reduce call times and decrease the cost of the service interaction. Another benefit of the inventive method and system is that by providing implicit caller transcript information to the CSA it is less likely that the CSA will repeat information to the user that was previously provided so that using the IVR increases customer satisfaction.

In accordance with one aspect of the present invention, a method of informing a customer service agent of details of a user's interaction with a voice retrieval system is provided which includes the steps of providing a user of a voice retrieval system with a list of one or more information items, playing the one or more information items to the user in response to one or more user inputs, storing a transcript of the user's interaction with the one or more information items, transferring the user from the voice retrieval system to a customer service agent in response to the one or more user inputs, and providing the customer service agent with the transcript of the user's interaction with the one or more information items.

Certain embodiments of the invention are outlined above in order that the detailed description thereof may be better understood, and in order that the present contributions to the art may be better appreciated. There are, of course, additional embodiments of the invention that will be described below and which will form the subject matter of the claims appended hereto.

In this respect, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

BRIEF DESCRIPTION OF THE SEVERAL VIEWS OF THE DRAWING

Further features of the present invention will become apparent to those skilled in the art to which the present invention relates from reading the following description with reference to the accompanying drawings, in which:

FIG. 2 shows a flow chart illustrating steps that may be followed in accordance with the inventive system and method;

FIG. 3 shows a flow chart illustrating steps that may be followed in accordance with an embodiment of the inventive system and method;

FIG. 4 illustrates a data record in which call interaction information is stored according to an embodiment of the inventive method and system;

FIG. 5 illustrates information from a call session interaction transcript record according to an embodiment of the inventive method and system; and FIG. 6 illustrates a data record in which the call session interaction transcript record of FIG. 5 is stored according to an embodiment of the inventive method and system.

DETAILED DESCRIPTION OF THE INVENTION

Figure 1:
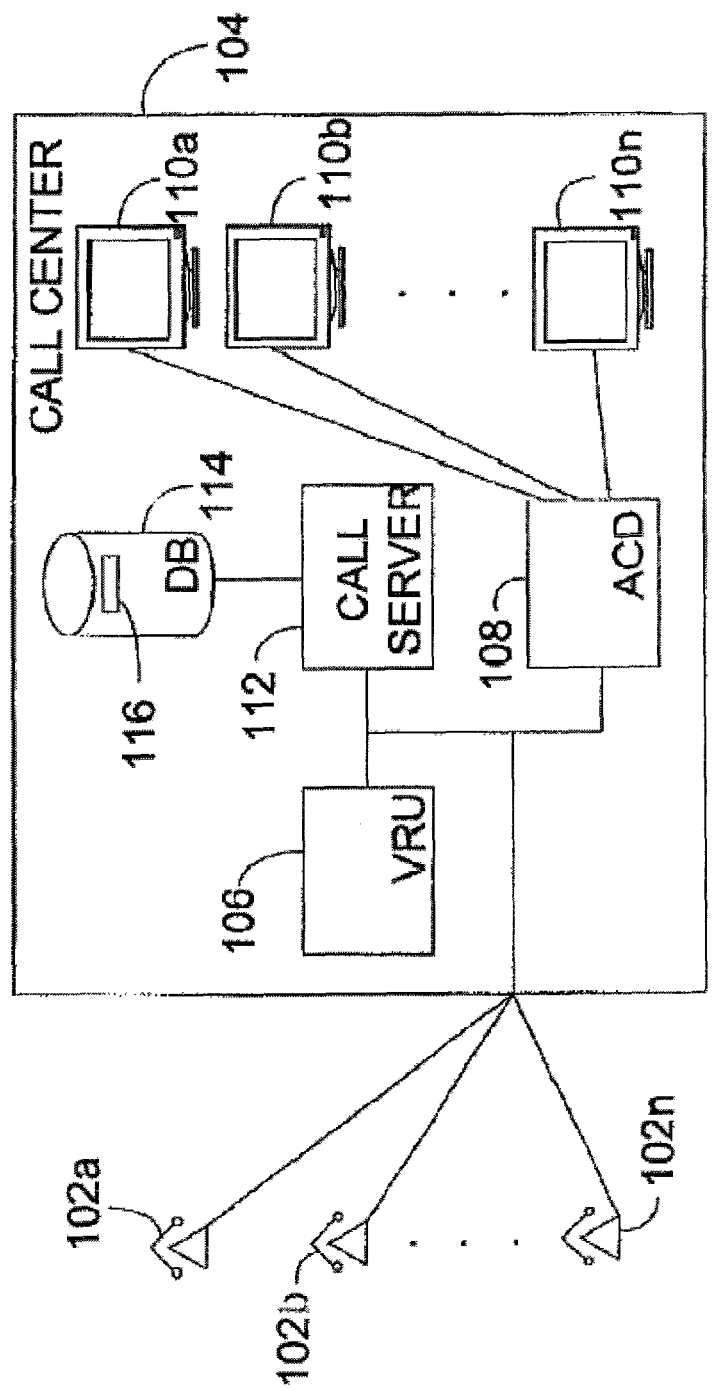
FIG. 1 illustrates a service center support environment in which an embodiment of the present inventive method and system may operate.

The invention will now be described with reference to the drawing figures, in which like reference numerals refer to like parts throughout. An embodiment in accordance with the present invention provides a system and method for presenting a dynamic interface over a telecommunications network, for instance a voice menu over a telephone system. For illustrative purposes, an embodiment of the invention is discussed below with reference to a customer support department that uses an automatic (self-service) phone answering system as a platform for customer communication and support. This is only an example of an operating environment, and is not intended to suggest any limitation in the scope of using or functionality of the invention. Neither should it be interpreted as implying any dependency or necessity of any one or combination of components illustrated in the exemplary operating environment.

FIG. 1 illustrates one such operating environment for an embodiment of the invention, in which one or more users may use one or more communication devices 102a, 102b, ... 102n (n arbitrary) to communicate with a call center 104, for instance to inquire about customer support, warranty, financial, billing or other information. The communication devices 102a, 102b ... 102n should be broadly construed to be or include, for instance, conventional telephones communicating via plain old telephone service (POTS), wireless mobile phones, personal digital assistants (PDA's), Smartphones, smart devices, tablet computers, video phones, webcams, communication appliances, or other mobile devices, voice over Internet Protocol (VoIP) clients, telephones connected via DSL or ISDN lines, computers, thin clients, or other communication devices.

The call center 104 may include a voice response unit 106, which is capable of presenting callers with an automated voice menu. In some embodiments of the present invention, the voice response unit 106 is capable of presenting a user with information items which may include information retrieval options, menu items, retrieval options, a keyword term search interface, and knowledgebase items. The voice menu may for instance be or include recorded human voices, or synthetic voices in different embodiments. Voice response unit 106 may for instance accept keypad inputs, voice or other inputs or responses from callers. It will be appreciated by one skilled in the art that the voice response unit 116, or a combination of the voice response unit and other system components, may also be referred to as a voice retrieval system, voice-based retrieval system, voice self-help system, information retrieval system, knowledgebase retrieval system, and the like.

The call center 104 may include an automatic call distributor 108 which may distribute incoming calls, selected calls or classes of calls from the one or more transmission devices 102a, 102b ... 102n to at least one of customer support stations 110a, 110b ... 110n (n arbitrary). Customer support stations 110a, 110b ... 110n may for example be or include computer workstations attended by human operators. According to some embodiments of the present invention, customer support stations 110a, 110b ... 110n may include an automated customer service agent which may also be referred to as a service agent, customer agent, or customer service agent.

The call center 104 may also include a call server 112, communicating with voice response unit 106 and automatic call distributor 108. Alternatively, in some embodiments, the call center 104 may include call server 112 which is capable of providing some or all of the functions performed by the voice response unit 106, the automatic call distributor 108, the customer support stations 110a, and the data repository 114. In some embodiments, the call server 112 may be capable of switching and routing incoming communications to the components of the call center 104 over one or more mediums of communication including across one or more networks which may be a distributed network implemented as an intranet, a local area network (LAN), or a wide area network (WAN) such as the internet. Call server 112 may likewise communicate with data repository 114 to access and store user account information, incoming or outgoing call time, duration, caller inputs and other parameters.

The call server 112 communicates with the voice response unit 106 and the data repository 114 to store an interaction transcript 116 that contains information about a user's interaction with the voice response unit 106. In some embodiments of the present invention, the interaction transcript contains details about a user's interaction with a voice response unit including specific menu selections to navigate the call tree, specific knowledge items that a user has listened to, how long the caller spent on any menu item, how long the caller listened to specific knowledge items, if there were any requests by the caller to repeat, stop, escape, or otherwise control the menu flow or knowledge item replay, as well as any free-form information entered by the caller such as search queries, product specifications, or any other explicit or implicit action performed by the caller. It will be appreciated that any or all details of a user's interaction may be referred to as a session interaction record, session record, transcript, session transcript, and the like. Since many voice response systems may include some capability to record caller activity, it may be possible to provide additional recording of a user's interaction activities in the same manner, which may differ by each system implementation.

FIG. 2 shows a flow chart illustrating an embodiment of the inventive method. In block 210, a service user has contacted a call center which has an integrated service system. In block 212, a service user has called or been transferred to a voice self-service system. In blocks 214 and 216, the voice self-service system prompts the service user for service-specific information. Service-specific information may include, but is not limited to, data identifying the user, data identifying the user's account with the service provider, or data identifying a specific product or service provided by the service provider. The user may provide the data using the telephone keypad, or by voice.

In block 218, the voice self-service system offers the user zero or more knowledgebase items to be delivered by audio via the telephone. In blocks 220 and 222, the user chooses one item at a time, which is then provided by the system via audio. It will be appreciated by one of skill in the art that the voice self-service system may provide a user with information items, retrieval options, keyword search results, and a keyword search interface. It will also be noted that information items may include one or more knowledgebase articles, search results, keyword searches, and/or menu items.

In block 224, the integrated service system stores a record of the user's interaction which may include information about the user's inputs, actions, and selections into an interaction transcript. In blocks 226 through 230, the voice self-service system offers to transfer the user's call to a human agent, and affects the transfer. The user's call is transferred to the integrated service system, which connects the user to a human customer service agent. According to some embodiments of the present invention, a customer service agent may be an information retrieval system. It will be appreciated by one skilled in the art that a customer service agent may refer to a human operator or an automated system. It should also be noted that a customer service agent may also be referred to as a customer agent, service agent, or support agent.

In blocks 232 through 236, the integrated service system retrieves the interaction transcript of the user's interaction with the voice self-service system, and displays the records on the customer service agent's computer. The customer service agent sees some or all of the identifying data provided by the user in blocks 214 and 216, and a written description, summary, or transcript of the knowledgebase items that the voice self-service system provided to the user via audio. In block 238, the user and customer service agent converse as necessary to complete the service interaction.

It should be noted that according to some embodiments of the present invention the step of recording a caller's interaction activity 224 may occur at any of a various number of locations (or multiple locations). For example, the step of recording a user's interaction into an interaction transcript may occur between items 214 and 216, between items 216 and 218, between items 220 and 222, between items 222 and 226, and/or between items 226 and 228.

An advantage of storing a transcript that includes details of a user's interaction is that it is possible to send the transcript to the user for later reference. The act of sending the transcript may be accomplished using any known communications method including sending the transcript via email or facsimile.

It will also be appreciated by those skilled in the art, that the term 'stores' as used in item 224 of the diagram implies saving an internal representation of the caller's actions into some system that can be accessed from outside the voice response system, such as a database, computer file, externally accessible memory area, or some equivalent record. According to one embodiment of the invention, the integrated system makes use of a database that is external to the voice response system. Additionally, the external database is accessible by any of a multitude of other interoperable components, such as a desktop customer resource management (CRM) system or e-mail management system, an internet text chat system, another voice response system, a phone system, a voice over IP system, or the like.

It should be noted that the knowledgebase audible menu sequence and/or presentation/providing information items, information retrieval options, retrieval options of the voice response system, may be interruptible, for instance by keypad or voice input, when a caller wants to supply a selection or other information while a menu item is playing. In some embodiments, voice menu items may be simultaneously or alternatively presented via a text or graphical interface, for instance on the screen of a cellular phone having short message service (SMS) or other messaging capability, or otherwise. It will also be appreciated that while the description of FIG. 2 involved a caller, embodiments of the present invention may be used with a user of any communications device.

FIG. 3 shows a flow chart illustrating another embodiment of the inventive method. In block 310, the user's call has been interfaced with a voice self-service system. In block 312, the voice self-service system provides the user with zero or more knowledgebase items for playback and a free form search option.

In block 314, the voice self-service system determines if the user has selected a free form search option. If the user has selected a search option, the system provides the user at block 316 with one or more search terms using voice or entering terms via the keypad. In response to the user provided search term or terms per block 316, the voice self-service system provides the user at 312 with zero or more knowledgebase items and a free form search option. If the system determines that the user has selected zero or more of the knowledgebase items in block 314, the system moves to block 318 and plays the knowledgebase item selected by the user.

In block 320, the voice self-service system prompts to see if the user wants to hear more information. If the user responds affirmatively, then the system returns the user to block 312 where the system again provides user with zero or more knowledgebase items and a free form search option. If the user chooses not to hear more information, the system moves the user to block 320 and a record of the user's interaction with the voice self-service system is stored.

As previously mentioned, it will be appreciated that the knowledgebase audible menu sequence may be interruptible, for instance by keypad or voice input, when a caller wants to supply a selection or other information while a menu item is playing. In embodiments, voice menu items may be simultaneously or alternatively presented via a text or graphical interface, for instance on the screen of a cellular phone having short message service (SMS) or other messaging capability, or otherwise.

FIG. 4 illustrates one an example of a database structure used to record the caller according to an embodiment of the inventive system and method. Item 402 refers to the column labeled 'Field' and describes the database column label or accessor for the data. Item 404 refers to the column labeled 'Type' and describes the content stored in the specified database column. Item 406 refers to the column labeled 'Null' and identifies those columns which may contain empty values. Item 408 specifies that the database will have a column to hold an identifier for the caller's session. This identifier could be randomly generated, it could be algorithmically generated (for example, using the current time), it could be something intrinsic to the call, such as the phone number of the caller, or any combination of those items. Item 410 is used to specify what type or segmentation of information was accessed, for example the interface containing sales information or the interface containing service information, the interface containing product line 'A' or the interface containing product line 'B.' Item 412 is used to mark the time of the caller action, allowing a sequence of caller actions to be reconstructed in the correct order.

Items 414 and 416 allow for the generic specification of pairs of identifying information about the system behavior. 'Parm' is used to specify a system parameter, while 'val' refers to the value set on that parameter for the current caller interaction. This generic structure would allow, for example, the identification of parm='Menu Selection' and val='Menu Item 3', or parm='Search Query' and val='Keywords Used For Searching' or parm='Information Item' and val='25.' In these examples, one skilled in the art could recognize the benefits of using encodings for the various types of 'parm' identifiers (e.g., instead of parm='Menu Selection' one could use parm='mem-sel' or even parm='act75' as long as the interoperable systems could recognize the various codes used), the possible combination of multiple parm/value pairs (one action consists of two rows, one having [parm, val] of ['Menu Selection', 'Menu Item 3'] and one having ['Information Item', '25'] to specify a caller selecting the $3^{rd}$ menu item, which consists of 'Information Item', 25). Finally, item 418 allows for storing system-recognized customers by some internal customer identification number.

One skilled in the art could easily see the exclusion of certain specified fields in FIG. 4 (such as the 'interface_id' or 'c_id') or the addition of other fields (e.g., 'originating_system' or 'phone_number') without violating the spirit or intent of the described inventive system. Similarly, a different storage mechanism entirely, but performing the same function, is also within the scope of the current invention.

Once the data is stored in a database with a structure as specified in FIG. 4, many methods are available for passing the identification of this information on to the next system in the sequence, e.g. a CRM agent desktop system. The technique for this hand-off between systems is not part of this inventive system, and could be done by using, e.g., the ANI re-encoding method of U.S. Pat. No. 6,661,882 which is incorporated herein by reference. Using the above example, the ANI may be re-encoded to pass along the session_id for the associated caller session as recorded in the session table of FIG. 4.

FIG. 5 illustrates an example of information from a call that is stored in a call session interaction transcript according to an embodiment of the inventive method and system. FIG. 6 illustrates an example of how the information from the interaction transcript of FIG. 5 is stored according to an embodiment of the inventive method and system.

EXAMPLE 1

Joe Customer calls the customer support line for Acme Inc. While on hold in the wait queue for support, the phone system offers the option for searching a knowledge base of information that may solve his problem without escalating to a support agent. Joe chooses to use this voice response system (IVR) either verbally or via a keypad selection. First the system prompts Joe for the product he has a question about (widget). Next, the system suggests three knowledge base items pertaining to widgets, or gives Joe the option to search. Joe chooses to listen to the first knowledge base item (id=7, "How to configure your Widget"). Since this item does not solve Joe's issue, when he returns to the menu he chooses the second item (id=23, "Features of the Widget"). This also does not answer his question, so he interrupts the presentation and when returning to the menu he chooses to search, and offers the search query "power supply." The system returns a set of results and Joe chooses to listen to the first item (id=50, "Battery options for Widgets"). This item does not solve his question, so he chooses to escalate to a human agent.

Upon transferring the call from the voice response system to the customer service agent's desktop, the agent is provided with the following information as shown in FIG. 5 and below:
 1. Phone call from 406-555-1212
   a. System query identifies that phone number maps to "Joe Customer"
 2. Selected product="Widget"
 3. Listened to item: id=7, "How to configure your Widget"
 4. Listened to item: id=23, "Features of the Widget"
 5. Interrupted item 23 after 15 seconds (total content=47 seconds)
 6. Searched using terms: "power supply"
 7. Listened to item: id=50, "Battery options for Widgets"

According to the data structure shown in FIG. 4, the above interaction transcript information will look similar to FIG. 6 and the table below stored in a data repository friendly format:

| Session_id | interface_id | timestamp | parm | val | c_id |
|---|---|---|---|---|---|
| 4065551212AA | 1 | 032706-12:55:55 | phone | 4065551212 | 55 |
| 4065551212AA | 1 | 032706-12:56:03 | prod | Widget | 55 |
| 4065551212AA | 1 | 032706-12:56:10 | item | 7 | 55 |
| 4065551212AA | 1 | 032706-12:56:10 | len | 50 | 55 |
| 4065551212AA | 1 | 032706-12:57:00 | item | 23 | 55 |
| 4065551212AA | 1 | 032706-12:57:00 | len | 47 | 55 |
| 4065551212AA | 1 | 032706-12:57:15 | inter | 15 | 55 |
| 4065551212AA | 1 | 032706-12:57:23 | srch | power supply | 55 |
| 4065551212AA | 1 | 032706-12:57:28 | item | 50 | 55 |
| 4065551212AA | 1 | 032706-12:57:28 | len | 39 | 55 |
| 4065551212AA | 1 | 032706-12:58:07 | opt | escallate | 55 |

At this point the customer support agent can immediately respond to Joe's calls in a personal fashion, such as: "Hello, Joe. I see you are having trouble with your Widget. Is there something wrong with your power supply?" And, depending on Joe's response, the customer support agent can know that he need not cover the information in items 7 and 50, and to stay away from talking about the features of widgets, as covered in item number 23. Thus, the customer support agent can immediately focus on the other content in the support knowledge base or compose a custom response.

EXAMPLE 2

Joe Customer calls the general line for Acme Travel. He is immediately presented with a voice response system to route his call to the appropriate location within Acme Travel. The prompts are: New Tickets, Travel Questions, Upgrades, or Refunds. Joe chooses New Tickets. The next prompt is International Travel or Domestic Travel, and Joe chooses International Travel. The system responds with Originating location and date, to which Joe replies "Bozeman, Mont." and May 19. The system then prompts for the destination, and Joe responds "London." Now the voice response system queries if this is the final destination. Joe responds, "No. From London to Edinburgh by train." The system responds with, "Your current itinerary is: Bozeman, Mont. to London, UK by air on May 19. Then from London, UK to Edinburgh, Scotland by train. Is this correct?" Joe responds in the affirmative. The system then responds, "Do you have any additional destinations?" Joe responds, "No." The system next prompts "and when would you like to return?" Joe suggests, "London on May 29, Bozeman on June 1." The system responds with, "I have you traveling from Bozeman, Mont. to London, UK by air May 19, and then continuing by train to Edinburgh, Scotland May 20. Departing Edinburg, Scotland for London, UK, by train on May 29. You then depart London by air for Bozeman, Mont. June 1. Is that correct?" Joe responds it is, to which the system replies, "Thank you. Please hold for the next available travel agent to complete your booking with specific departure and arrival times, airlines, and for any special needs."

When the voice response system forwards Joe's call to the travel agent, the information in Joe's session transcript will include:

1. Phone call from 406-555-1212
   a. System query identifies that phone number maps to "Joe Customer"
2. Customer selected menu item "Ticket Sales"
3. Customer selected menu item "International Travel"
4. Customer entered departure location "Bozeman, Mont."
5. Customer entered time "May 19"
6. Customer entered arrival location "London"
   a. System query identifies "London" as "London, UK"
7. Customer selects additional destination
8. Customer specifies "From London to Edinburgh by Train"
   a. System query identifies arrival location "Edinburgh"
   b. System query identifies "Edinburgh" as "Edinburgh, Scotland"
   c. System query identifies travel modality as "train"
9. System generated outbound itinerary id=111AAA
10. Customer responds "yes" to system itinerary id=111AAA
11. Customer specifies no additional destinations
12. Customer specifies departure information "London on May 29, Bozeman on June 1."
    a. System query identifies departure location="Edinburgh, Scotland"
    b. System query identifies departure date="May 29"
    c. System query identifies arrival location="London, UK"
    d. System query identifies departure location="London, UK"
    e. System query identifies departure date="June 1"
    f. System query identifies arrival location="Bozeman, Mont."
13. System updated itinerary id=111AAA
14. Customer responds "yes" to system itinerary id=111AAA According to the data structure example of FIG. 4, the data repository formatted version of above interaction transcript information will look something like:

| Session_id | interface_id | timestamp | parm | val | c_id |
|---|---|---|---|---|---|
| 4065551212AB | 1 | 032706-12:55:55 | phone | 4065551212 | 55 |
| 4065551212AB | 4 | 032706-12:56:03 | intf | 4 | 55 |
| 4065551212AB | 4 | 032706-12:56:10 | item | intl | 55 |
| 4065551212AB | 4 | 032706-12:56:12 | dep_q | Bozeman Montana | 55 |
| 4065551212AB | 4 | 032706-12:56:12 | dep | BZN | 55 |
| 4065551212AB | 4 | 032706-12:56:20 | date | May 29 | 55 |
| 4065551212AB | 4 | 032706-12:56:45 | arr_q | London | 55 |
| 4065551212AB | 4 | 032706-12:56:46 | arr | GWK | 55 |
| 4065551212AB | 4 | 032706-12:57:15 | more | yes | 55 |
| 4065551212AB | 4 | 032706-12:57:20 | dep | GWK | 55 |
| 4065551212AB | 4 | 032706-12:57:23 | arr_q | Edinburgh | 55 |

-continued

| Session_id | interface_id | timestamp | parm | val | c_id |
|---|---|---|---|---|---|
| 4065551212AB | 4 | 032706-12:57:23 | arr | EDI | 55 |
| 4065551212AB | 4 | 032706-12:57:28 | type | train | 55 |
| 4065551212AB | 4 | 032706-12:57:28 | it_id | 111AAA | 55 |
| 4065551212AB | 4 | 032706-12:58:07 | ok | yes | 55 |
| 4065551212AB | 4 | 032706-12:58:15 | more | no | 55 |
| 4065551212AB | 4 | 032706-12:58:23 | dep_q | Edinburgh | 55 |
| 4065551212AB | 4 | 032706-12:58:23 | dep | EDI | 55 |
| 4065551212AB | 4 | 032706-12:58:23 | date | May 29 | 55 |
| 4065551212AB | 4 | 032706-12:58:23 | arr_q | London | 55 |
| 4065551212AB | 4 | 032706-12:58:23 | arr | GWK | 55 |
| 4065551212AB | 4 | 032706-12:58:24 | dep | GWK | 55 |
| 4065551212AB | 4 | 032706-12:58:24 | date | June 1 | 55 |
| 4065551212AB | 4 | 032706-12:58:24 | arr_q | Bozeman | 55 |
| 4065551212AB | 4 | 032706-12:58:24 | arr | BZN | 55 |
| 4065551212AB | 4 | 032706-12:58:28 | it_id | 111AAA | 55 |
| 4065551212AB | 4 | 032706-12:59:07 | ok | yes | 55 |

At this point the travel agent can respond with, "Hello, Joe. I see you have used our automated system to request an international trip to Edinburgh by train via London. Would you like to finalize your booking now? If so, I will need your credit card and frequent flyer numbers." After the agent completes the billing process for the selected itinerary, Joe asks about visa requirements for his journey. The agent responds, "Let me transfer you to our automated system to answer your questions." At this point Joe enters a second system that prompts him for "Domestic or International Travel?" and Joe responds "international." The system then suggests three information items about international travel, or gives the option to search all content. Joe selects the second item (id=42, "Passport requirements for international travel"). Upon returning to the list, Joe decides to search, using "England visa requirements." The system returns with one item (id=1006, "Visa requirements for UK travel").

After listening to the item, Joe hangs up. In addition to the earlier call interaction details, Joe's interaction transcript also includes:

15. Travel agent booking
16. Transfer to automated help system
17. Customer selected "International" travel
18. Listened to item 42: "Passport requirements for international travel"
19. Searched using terms: "England visa requirements."
20. Listened to item 1006: "Visa requirements for UK travel"
21. Call terminated Or, continuing the database table:

| 4065551212AB | 2 | 032706-13:15:55 | agent | Bob Smith | 55 |
|---|---|---|---|---|---|
| 4065551212AB | 2 | 032706-13:15:55 | it_id | 111AAA | 55 |
| 4065551212AB | 2 | 032706-13:15:55 | cc_t | Visa | 55 |
| 4065551212AB | 2 | 032706-13:15:55 | cc | 1234567891231234-0307 | 55 |
| 4065551212AB | 3 | 032706-13:16:03 | prod | International | 55 |
| 4065551212AB | 3 | 032706-13:16:10 | item | 42 | 55 |
| 4065551212AB | 3 | 032706-13:16:10 | len | 54 | 55 |
| 4065551212AB | 3 | 032706-13:17:04 | srch | England Visa Requirements | 55 |
| 4065551212AB | 3 | 032706-13:17:05 | item | 1006 | 55 |
| 4065551212AB | 3 | 032706-13:17:45 | hangup | 1 | 55 |

EXAMPLE 3

Joe customer calls the voice response system at Acme Bank, hoping to reset his account password. He is prompted with the menu selections of: Member Services, Support, or Online Tools. All of these and none of these appear appropriate, so Joe chooses "Online Tools." He is then presented with four information items detailing the available offerings at the bank, including: Loan Applications, Repayment Calculators, Mailing List subscriptions, and Online Bill Paying. Joe reluctantly chooses "Online Bill Paying" because it might talk about password resetting.

After listening for a few seconds it becomes clear that the information is marketing driven and will not discuss his desired problem. He interrupts the presentation of the information item, but the system returns him to the original four choices. At this point, Joe says, "Go Back," which the system interprets as a search query. It returns with the prompt, "We do not have any information in our Online Tools section about your inquiry." Joe realizes he might just ask about password reset, so he then says, "I want to reset my password." The system responds with, "We do not have any information in our Online Tools section about your inquiry." At this point Joe becomes frustrated and says, "I want to talk to a person." The system recognizes this request for escalation and transfers Joe to a support representative.

The transfer to a bank representative includes the following information:

1. Phone call from 406-555-1212
   a. System query identifies that phone number maps to "Joe Customer"
2. Selected Menu="Online Tools"
3. Listened to item: id=23, "Online Bill Paying"
4. Interrupted item 23 after 15 seconds (total content=47 seconds)
5. Searched using terms: "Go Back"
6. No responses returned
7. Searched using terms: "I Want To Reset My Password"
8. No responses returned
9. Searched using terms: "I Want To Talk To A Person"

Which may be stored in the system as a interaction transcript record as follows:

| Session_id | interface_id | timestamp | parm | val | c_id |
|---|---|---|---|---|---|
| 4065551212AC | 1 | 032706-12:55:55 | phone | 4065551212 | 55 |
| 4065551212AC | 5 | 032706-12:56:03 | cat | Online Tools | 55 |
| 4065551212AC | 5 | 032706-12:56:10 | item | 23 | 55 |
| 4065551212AC | 5 | 032706-12:56:10 | len | 47 | 55 |
| 4065551212AC | 5 | 032706-12:57:25 | inter | 15 | 55 |
| 4065551212AC | 5 | 032706-12:57:30 | srch | go back | 55 |
| 4065551212AC | 5 | 032706-12:57:32 | results | 0 | 55 |
| 4065551212AC | 5 | 032706-12:57:35 | srch | I want to reset my password | 55 |
| 4065551212AC | 5 | 032706-12:57:38 | results | 0 | 55 |
| 4065551212AC | 5 | 032706-12:57:40 | srch | I want to talk to a person | 55 |
| 4065551212AC | 5 | 032706-12:57:41 | opt | escallate | 55 |

This support representative, upon reviewing Joe's interaction with the voice response system, responds in a knowledgeable and personal manner, "Hi, Joe. I see you have been having trouble with our automated system. It appears you are looking for how to reset your password for your Bill Paying, but that information is available in our Member Services area, not our Online Tools area. I can see how this would be confusing. However, I can do that reset for you."

According to one embodiment of the present invention, the method is implemented as a computer program, namely, as a set of instructions executed by a processor. Thus, for example, the method may be a cross-platform java application, a standalone application written in native code, a distinct process built into a server, or part of an application server accessible via thin client or web browser functionality. One of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

We claim:

1. A method of informing a customer service agent of details of a user's interaction with a voice retrieval system comprising the steps of:
providing a user of a voice retrieval system with a list of one or more information items, wherein said list of one or more information items includes results from a keyword search;
playing said one or more information items to said user in response to one or more user inputs;
storing a transcript of said user's interaction with said one or more information items including information related to explicit actions performed by the user and implicit actions performed by the user, the information related to explicit actions performed by the user comprising the list of one or more information items provided to the user and the one or more user inputs, menu flow control information, and free form information provided by the user, the information related to implicit actions performed by the user comprising identification data provided by the user, a summary of each knowledgebase information item provided to the user during said user's interaction, and information related to one or more requests from the user to control a menu flow, wherein said request to control the menu flow comprises a request to repeat, stop, or escape a knowledgebase information item occurring during playback of the knowledgebase information item;
transferring said user to a customer service agent in response to said one or more user inputs; and
providing said customer service agent with said transcript of the user's interaction with said one or more information items.

2. The method of claim 1 wherein said transcript includes a list of terms input by the user for searching.

3. The method of claim 2 wherein said transcript includes a list of the information items that were played in response to said one or more user inputs.

4. The method of claim 1 further comprising the step of sending a copy of said transcript to said user.

5. The method of claim 1 wherein said details of an interruption include the amount of time an information item was played before playback was interrupted.

6. A method of informing a customer service agent of details of a caller's interaction with voice-based knowledgebase retrieval system comprising the steps of:
providing a caller with a list of one or more knowledgebase items, wherein said list of one or more knowledgebase items includes one or more results from a keyword search;
playing said one or more knowledgebase items in response to one or more caller inputs;
storing an interaction transcript comprising information related to explicit actions performed by the user and implicit actions performed by the user, the information related to explicit actions performed by the user comprising the list one the one or more knowledgebase items provided to the user, information about which of said one or more knowledgebase items were played, said results from said keyword search, menu flow control information, and free form information provided by the user, the information related to implicit actions performed by the user comprising identification data provided by the user, a summary of each knowledgebase information item provided to the user during said user's interaction, and information related to one or more requests from the user to control a menu flow, wherein said request to control the menu flow comprises a request to repeat, stop, or escape a knowledgebase information item occurring during playback of the knowledgebase information item;
transferring said caller to a human agent in response to said one or more inputs; and
providing said human agent with said interaction transcript.

7. The method of claim 6 wherein said interaction transcript includes a list of terms the caller input for searching.

8. The method of claim 7 wherein said interaction transcript includes a list of the knowledgebase items that were played.

9. The method of claim 6 further comprising the step of sending a copy of said interaction transcript to said caller via email.

10. The method of claim 6 wherein said details of an interruption include the amount of time a knowledgebase item was played before playback was interrupted.

11. A method of informing one agent of details of a user's interaction with another agent comprising the steps of:
providing one or more information retrieval options to a user in response to one or more user inputs, wherein said one or more retrieval options is a keyword search;
storing an interaction transcript comprising information related to explicit actions performed by the user and implicit actions performed by the user, the information related to explicit actions performed by the user comprising the one or more information retrieval options provided to the user, a list of results from said keyword search, which said information retrieval options were provided to said user, which information retrieval option said user chose, menu flow control information, and free form information provided by the user, the information related to implicit actions performed by the user comprising identification data provided by the user, a summary of each knowledgebase information item provided to the user during said user's interaction, and information related to one or more requests from the user to control a menu flow, wherein said request to control the menu flow comprises a request to repeat, stop, or escape a knowledgebase information item occurring during playback of the knowledgebase information item;
transferring said user to a different agent in response to said one or more user inputs; and
providing said different agent with said interaction transcript.

12. The method of claim 11 wherein said interaction transcript includes a list of terms the user input for searching.

13. The method of claim 11 further comprising the step of sending a copy of said interaction transcript to said user.

14. The method of claim 12 wherein said interaction transcript includes details of an interruption occurring during playback of a retrieval option.

15. The method of claim 14 wherein said details of an interruption include the amount of time a retrieval option was played before playback was interrupted.

16. A method of informing a second customer agent of details of a caller's interaction with a first customer agent comprising the steps of:
providing one or more retrieval options to a caller in a call with a first customer agent, wherein said one or more retrieval options is a keyword search;
playing said one or more retrieval options for said caller in response to one or more inputs;
storing a session interaction record which includes information related to explicit actions performed by the user and implicit actions performed by the user, the information related to explicit actions performed by the user comprising the one or more retrieval options provided to the caller, a list of results from said keyword search, which of said one or more retrieval options were played for said caller, which information retrieval option said caller chose, menu flow control information, and free form information provided by the user, the information related to implicit actions performed by the user comprising identification data provided by the user, a summary of each knowledgebase information item provided to the user during said user's interaction, and information related to one or more requests from the user to control a menu flow, wherein said request to control the menu flow comprises a request to repeat, stop, or escape a knowledgebase information item occurring during playback of the knowledgebase information item;
transferring said caller to a second customer agent in response to said one or more inputs; and
providing said customer agent with said session interaction record.

17. The method of claim 16 wherein said session interaction record includes a list of terms the caller input for searching.

18. The method of claim 16 further comprising the step of sending a copy of said session interaction record to said caller.

19. The method of claim 17 wherein said session interaction record includes details of an interruption occurring during playback of a retrieval option.

20. The method of claim 19 wherein said details of an interruption include the amount of time a retrieval option was played before playback was interrupted.

21. A method of informing a customer service agent of details of a user's interaction with an information retrieval system comprising the steps of:
presenting a user with one or more information items, wherein said one or more information items includes results from a keyword search;
playing said one or more information items for user in response to one or more inputs;
storing a session record which includes information related to explicit actions performed by the user and implicit actions performed by the user, the information related to explicit actions performed by the user comprising the one or more information items presented to the user, a list of results from said keyword search, which of said one or more information items were played for said user, which of said information item said user chose, menu flow control information, and free form information provided by the user, the information related to implicit actions performed by the user comprising identification data provided by the user, a summary of each knowledgebase information item provided to the user during said user's interaction, and information related to one or more requests from the user to control a menu flow, wherein said request to control the menu flow comprises a request to repeat, stop, or escape a knowledgebase information item occurring during playback of the knowledgebase information item;
transferring said user to a customer service agent in response to one or more inputs; and
providing said customer service agent with said session record.

22. A system comprising:
a processor; and
a memory coupled with and readable by the processor and having stored therein a set of instructions which, when executed by the processor, causes the processor to inform a service agent of details of a user's interaction with an information retrieval system by providing a user of an information retrieval system with a list of one or more information items, wherein said list of one or more information items includes one or more results from a keyword search, playing said one or more information items in response to one or more user inputs, storing an interaction transcript comprising information related to explicit actions performed by the user and implicit actions performed by the user, the information related to explicit actions performed by the user comprising the list of one or more information items provided to the user, a list of said results from said keyword search, information about which of said one or more information items were played, which of said information items said user chose transferring said user to a service agent in response to said one or more user inputs, menu flow control information, and free form information provided by the user, the information related to implicit actions performed by the user comprising identification data provided by the user, a summary of each knowledgebase information item provided to the user during said user's interaction, and information related to one or more requests from the user to control a menu flow, wherein said request to control the menu flow comprises a request to repeat, stop, or escape a knowledgebase information item occurring during playback of the knowledgebase information item, and providing said service agent with said interaction transcript.

23. The system of claim 22 wherein said interaction transcript includes a list of terms input by the user for searching.

24. The system of claim 23 wherein said interaction transcript includes a list of the information items that were played in response to said one or more user inputs.

25. The system of claim 22 wherein said details of an interruption include the amount of time an information item was played before playback was interrupted.

26. A system comprising:
a processor; and
a memory coupled with and readable by the processor and having stored therein a set of instructions which, when executed by the processor, cause the processor to inform a second service agent of details of a caller's interactions with a first service agent by providing one or more retrieval options to a caller in a call with a first service agent, wherein said one or more retrieval options is a keyword search, playing said one or more retrieval options in response to one or more inputs, storing an interaction record which includes information related to explicit actions performed by the user and implicit actions performed by the user, the information related to explicit actions performed by the user comprising the one or more retrieval options provided to the caller, a list of results from said keyword search, which of said one or more retrieval options were played, which of said retrieval options said caller chose, menu flow control information, and free form information provided by the user, the information related to implicit actions performed by the user comprising identification data provided by the user, a summary of each knowledgebase information item provided to the user during said user's interaction, and information related to one or more requests from the user to control a menu flow, wherein said request to control the menu flow comprises a request to repeat, stop, or escape a knowledgebase information item occurring during playback of the knowledgebase information item, transferring said caller to a second service agent in response to said one or more inputs, and providing said second service agent with said interaction record.

27. The system of claim 26 wherein said interaction record includes a list of terms the caller input for searching.

28. The system of claim 27 wherein said interaction record includes a list of the retrieval options played in response to one or more inputs.

29. The system of claim 28 wherein said interaction record includes details of an interruption occurring during playback of a retrieval option.

30. The system of claim 29 wherein said details of an interruption include the amount of time a retrieval option was played before playback was interrupted.

31. A non-transitory computer readable storage device having stored thereon a computer program which, when executed by a processor, causes the processor to inform a service agent of details of a user's interaction with an information retrieval system by:
providing one or more information options to a user, wherein said one or more information options includes one or more results from a keyword search;
playing said one or more information options in response to one or more inputs;
storing a transcript including information related to explicit actions performed by the user and implicit actions performed by the user, the information related to explicit actions performed by the user comprising the one or more information options provided to the user and information of said user's interaction with said one or more information options, menu flow control information, and free form information provided by the user, the information related to implicit actions performed by the user comprising identification data provided by the user, a summary of each knowledgebase information item provided to the user during said user's interaction, and information related to one or more requests from the user to control a menu flow, wherein said request to control the menu flow comprises a request to repeat, stop, or escape a knowledgebase information item occurring during playback of the knowledgebase information item;
transferring said user to a service agent in response to said one or more inputs; and
providing said service agent with said transcript.

32. The non-transitory computer readable storage device according to claim 31, wherein said transcript includes a list of the information options played in response to said one or more inputs.

33. The non-transitory computer readable storage device according to claim 32, wherein said transcript includes details of an interruption occurring during playback of an information option.

34. The non-transitory computer readable storage device according to claim 33, wherein said details of an interruption include the amount of time an information option was played before playback was interrupted.

* * * * *